US006995879B2

(12) United States Patent  
Sugiyama et al.

(10) Patent No.: US 6,995,879 B2
(45) Date of Patent: Feb. 7, 2006

(54) IMAGE SENSING APPARATUS

(75) Inventors: Yukinobu Sugiyama, Hamamatsu (JP); Seiichiro Mizuno, Hamamatsu (JP)

(73) Assignee: Hamamatsu Photonics K.K., Shizuoka-Ken (JP)

( * ) Notice: Subject to any disclaimer, the term of this patent is extended or adjusted under 35 U.S.C. 154(b) by 861 days.

(21) Appl. No.: 09/964,450

(22) Filed: Sep. 28, 2001

(65) Prior Publication Data

US 2002/0054393 A1 May 9, 2002

Related U.S. Application Data

(63) Continuation-in-part of application No. PCT/JP99/01967, filed on Apr. 13, 1999.

(51) Int. Cl.
*H04N 1/04* (2006.01)
(52) U.S. Cl. ..................... 358/482; 358/474; 250/208.1
(58) Field of Classification Search ................ 358/482, 358/483, 512–514, 474, 497, 496, 494; 250/208.1, 250/214 R, 214 A, 559.39; 348/308, 300–307, 348/241, 297, 294, 299; 356/226, 222, 221; 382/312
See application file for complete search history.

(56) References Cited

U.S. PATENT DOCUMENTS

| 5,424,530 A | * | 6/1995 | Mizuno | ................... 250/214 R |
| 6,606,121 B1 | * | 8/2003 | Bohm et al. | ................. 348/297 |
| 6,606,123 B2 | * | 8/2003 | Mizuno | ....................... 348/308 |
| 6,642,501 B2 | * | 11/2003 | Mizuno | ................... 250/214 R |

FOREIGN PATENT DOCUMENTS

| JP | 4-267672 | 9/1992 |
| JP | 5-215602 | 8/1993 |
| JP | 6-105069 | 4/1994 |
| JP | 6-178046 | 6/1994 |
| WO | WO 98/14002 | 4/1998 |

* cited by examiner

Primary Examiner—Cheukfan Lee
(74) Attorney, Agent, or Firm—Drinker, Biddle & Reath LLP

(57) ABSTRACT

An image sensing apparatus (10) has n photodiodes (PD1-PDn), signal processors (SP1-SPn), and output switches (SW1-SWn) connected to each other. Each signal processor includes an integrator (12) for amplifying an output from the photodiode, a buffer (14) for holding an output from the integrator (12), a first switch (16) inserted between the photodiode and the integrator (12), a second switch (18) for connecting the photodiode and an overflow drain ($V_{ofd}$), a third switch (20) inserted between the integrator (12) and the buffer (14), a fourth switch (22) for connecting the buffer (14) and a reference voltage ($V_{ref}$) source, and a controller (24) for controlling the ON/OFF operation of the first to fourth switches based on the comparison result between an output voltage from the integrator (12) and the reference voltage ($V_{ref}$).

2 Claims, 6 Drawing Sheets

IMAGE SENSING APPARATUS

RELATED APPLICATION

The present application is a continuation-in-part application of PCT application No. PCT/JP99/01967 filed on Apr. 13, 1999, designating U.S.A. and now pending.

BACKGROUND OF THE INVENTION

1. Field of the Invention

The present invention relates to an image sensing apparatus.

2. Related Background Art

An image sensing apparatus having an array of a plurality of photodetectors such as silicon photodiodes is known as an image sensing apparatus used to sense a relatively large object or sense a close-up image from a near distance.

An example of such image sensing apparatus is a solid-state image sensing apparatus disclosed in Japanese Patent Laid-Open No. 6-178046. In the solid-state image sensing apparatus, a plurality of photodiodes form an array. An integrator for integrating charges output from a corresponding photodiode and outputting a voltage corresponding to the integrated charge amount is arranged for each photodiode. The apparatus further uses a switch for connecting the integrator to an external output line. Outputs from the respective photodiodes can be sequentially externally output.

This image sensing apparatus has a large image sensing range by forming a plurality of photodiodes into an array, and thus can sense a large object or close-up image. The image sensing apparatus is widely used as, e.g., an X-ray non-destructive inspection apparatus detector used for foreign matter inspection for foods or baggage inspection, or a contact type linear image sensor arranged in an image reader such as a facsimile.

SUMMARY OF THE INVENTION

The above image sensing apparatus can sense a large object or close-up image because of a large image sensing range obtained by forming a plurality of photodiodes into an array, but suffers the following problems.

In many cases, the objects to be sensed have various shapes regardless of foreign matter inspection for foods or baggage inspection, and originals to be read by the image reader have various sizes. For this reason, light with a low intensity that has passed through an object to be sensed, and background light having a very high intensity that has not passed through the object are simultaneously incident on the photodetective region of the image sensing apparatus, i.e., the photodiode array.

Assume that the image sensing apparatus is a contact type linear image sensor arranged in an image reader such as a facsimile. The image reader such as a facsimile must discriminate the white background part and black character part of a sensed image from each other. For this purpose, the contact type linear image sensor used by the image reader is generally adjusted to discriminate the white part and the black part by the intensity of light having passed through an original.

Under this adjustment, however, light having an intensity several ten times that of light having passed through the original is incident on a photodetective region, i.e., photodiode at a portion not covered with the original. Then, excessive charges flow into a subsequent integrator.

Excessive charges flowing into the integrator cause offset variations in input/output voltage of an operational amplifier constituting the integrator. Such offset variations vary the bias voltage of the operational amplifier.

The operational amplifier of an integrator connected to each corresponding photodiode generally is biased a common voltage. Variations in bias voltage in the operational amplifier of one integrator affect the operational amplifiers of other integrators. As a result, the integrators malfunction.

It is, therefore, an object of the present invention to provide an image sensing apparatus which hardly malfunctions and stably operates by preventing variations in bias voltage of an operational amplifier caused by excessive charges flowing into an integrator.

To solve the above problems, an image sensing apparatus according to the present invention is characterized by comprising a plurality of photodetectors, resettable integrators which are arranged for the respective photodetectors, integrate charges output from the photodetectors, and output voltage corresponding to integrated charge amounts, output switches arranged on output sides of the respective integrators to connect the integrators to an external output line, a first switch series-inserted between each photodetector and each integrator, and a controller for closing the first switch when an absolute value of an output voltage from the integrator is lower than a predetermined reference voltage, and opening the first switch when the absolute value of the output voltage from the integrator is not lower than the predetermined reference voltage.

When the absolute value of the output voltage from the integrator is lower than the predetermined reference voltage, the first switch is closed. In general, charges output from the photodetector can be integrated in the integrator. To the contrary, when the absolute value of the output voltage from the integrator is equal to or higher than the predetermined reference voltage, the first switch is opened. Thus, if the photodetector excessively outputs charges, the excessive charges can be prevented from flowing into the integrator. This can effectively prevent variations in offset voltage of an operational amplifier constituting the integrator, and variations in bias voltage. Accordingly, malfunction can be reduced to stabilize the operation.

DESCRIPTION OF THE PREFERRED EMBODIMENTS

Figure 1:
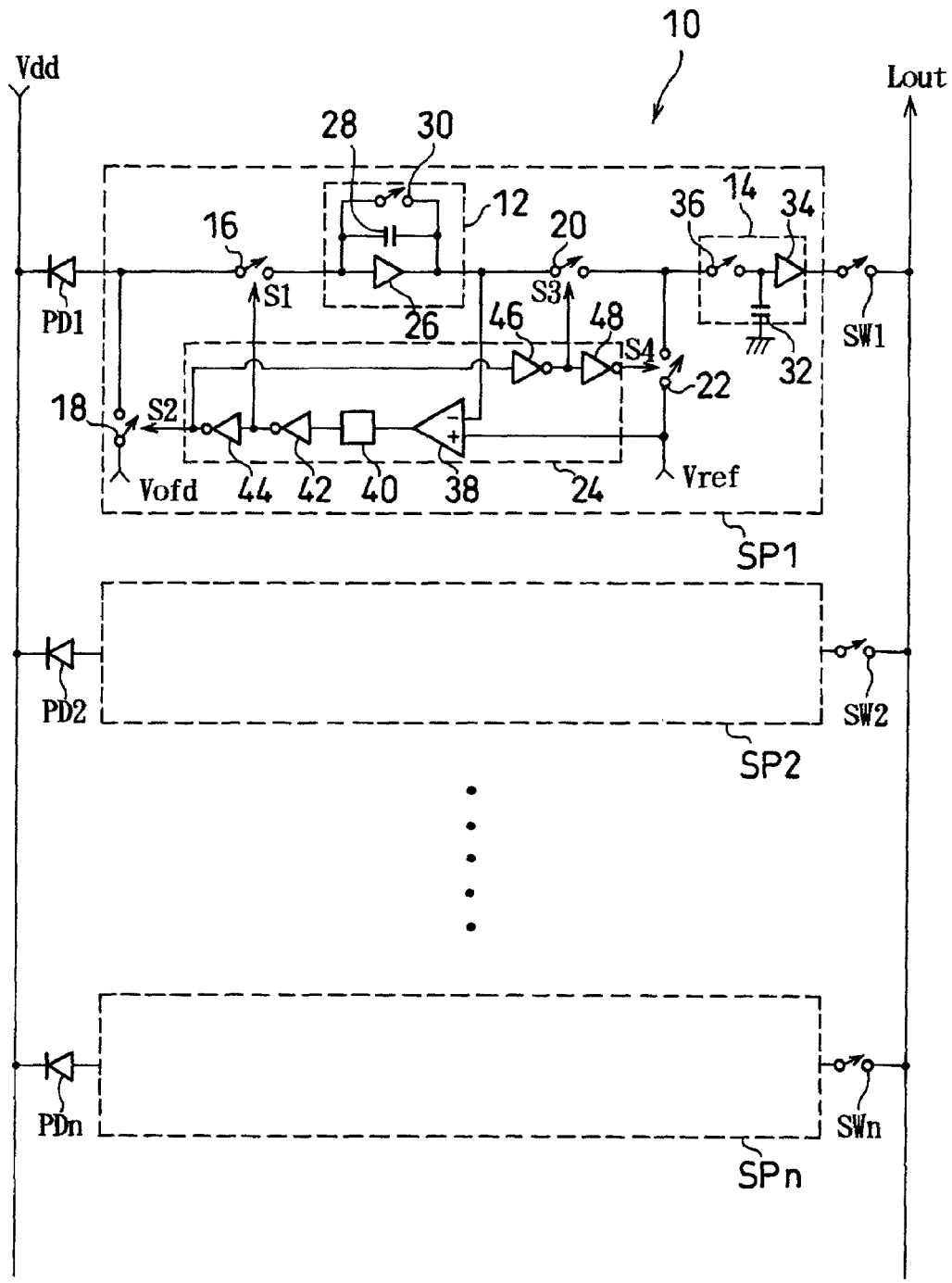
FIG. 1 is a circuit diagram showing an image sensing apparatus.

An image sensing apparatus according to an embodiment of the present invention will be described with reference to the accompanying drawings. The arrangement of the image sensing apparatus according to this embodiment will be explained. FIG. 1 shows the circuit arrangement of the image sensing apparatus according to the embodiment.

An image sensing apparatus 10 comprises n (n is an integer of 2 or more) photodiodes (photodetectors) PD1 to PDn which is biased a predetermined reverse voltage $V_{dd}$ at their cathodes, n signal processors SP1 to SPn for individually integrating charge output from the photodiodes PD1 to PDn and outputting voltage corresponding to the integrated charge amounts, and n output switches SW1 to SWn arranged on the output sides of the signal processors SP1 to SPn to connect them to an external output line $L_{out}$.

The n signal processors SP1 to SPn have the same arrangement, and only one signal processor SP1 will be explained (in FIG. 1, the signal processors SP2 to SPn are not illustrated).

The signal processor SP1 is comprised of a resettable integrator 12 for integrating charges output from the photodiode PD1 and outputting a voltage corresponding to the integrated charge amount, a buffer 14 for temporarily holding the output voltage from the integrator 12, a first switch 16 series-inserted between the anode of the photodiode PD1 and the input terminal of the integrator 12, a second switch 18 for connecting the anode of the photodiode PD1 and an overflow drain $V_{ofd}$ for removing excessive charges output from the photodiode PD1, a third switch 20 series-inserted between the output terminal of the integrator 12 and the input terminal of the buffer 14, a fourth switch 22 for connecting the input terminal of the buffer 14 and a supply source for supplying a predetermined reference voltage $V_{ref}$, and a controller 24 for opening or closing the first to fourth switches based on the comparison result between the reference voltage $V_{ref}$ and an output voltage from the integrator 12.

The integrator 12 is made up of an operational amplifier 26 for amplifying a signal input from the input terminal and outputting the amplified signal from the output terminal, a capacitor 28 parallel-connected to the operational amplifier 26 in order to integrate charges output from the photodiode PD1, and a reset switch 30 parallel-connected to the capacitor 28 in order to remove (reset) charges integrated in the capacitor 28 in accordance with an externally input reset pulse.

The buffer 14 has a capacitor 32 for holding as charges an output voltage output from the output terminal of the integrator 12, an operational amplifier 34 for amplifying the voltage held by the capacitor 32 and outputting the amplified voltage to the external output line $L_{out}$ upon closing the output switch SW1, and a hold switch 36 which is closing by an externally input hold pulse to connect the output terminal of the integrator 12 to the capacitor 32 by ON operation.

The controller 24 is made up of a comparator 38 which receives the reference voltage $V_{ref}$ and an output voltage from the integrator 12, outputs logical value 1 when the absolute value of the output voltage from the integrator 12 (in the image sensing apparatus 10 according to this embodiment, the p-type layer of the photodiode is connected to the integrator 12, the output voltage is positive, and thus this positive output voltage will be simply referred to as an output voltage) is lower than the reference voltage $V_{ref}$, and outputs logical value 0 when the output voltage from the integrator 12 is equal to or higher than the reference voltage $V_{ref}$. The controller 24 further comprises a latch 40 for temporarily holding a logical value output from the comparator 38, and four inverters 42, 44, 46, and 48 for generating logic signals (to be referred to as control signals hereinafter) for controlling the first to fourth switches 16, 18, 20 and 22 by directly using or inverting the logical value output from the latch 40.

The switch control function of the controller 24 will be described in detail. The first to fourth switches 16, 18, 20 and 22 are opened when the logical values of control signals S1 to S4 input to these switches are 1, and closed when the logical values are 0.

The first switch 16 receives the control signal S1 obtained by inverting a logical value output from the comparator 38 by the inverter 42. That is, the control signal S1 is 0 when the output voltage from the integrator 12 is lower than the reference voltage $V_{ref}$, and is 1 when the output voltage from the integrator 12 is equal to or higher than the reference voltage $V_{ref}$. Therefore, the first switch 16 is closed when the output voltage from the integrator 12 is lower than the reference voltage $V_{ref}$, and is opened when the output voltage from the integrator 12 is equal to or higher than the reference voltage $V_{ref}$.

The second switch 18 receives the control signal S2 obtained by inverting the logical value output from the comparator 38 by the inverter 42 and further inverting it by the inverter 44. The second switch 18 is opened when the output voltage from the integrator 12 is lower than the reference voltage $V_{ref}$, and is closed when the output voltage from the integrator 12 is equal to or higher than the reference voltage $V_{ref}$.

The third switch 20 receives the control signal S3 obtained by inverting the logical value output from the comparator 38 by the inverters 42, 44, and 46. The third switch 20 is closed when the output voltage from the integrator 12 is lower than the reference voltage $V_{ref}$, and is opened when the output voltage from the integrator 12 is equal to or higher than the reference voltage $V_{ref}$.

The fourth switch 22 receives the control signal S4 obtained by inverting the logical value output from the comparator 38 by the inverters 42, 44, 46, and 48. The fourth switch 22 is opened when the output voltage from the integrator 12 is lower than the reference voltage $V_{ref}$, and is closed when the output voltage from the integrator 12 is equal to or higher than the reference voltage $V_{ref}$.

Figure 2:
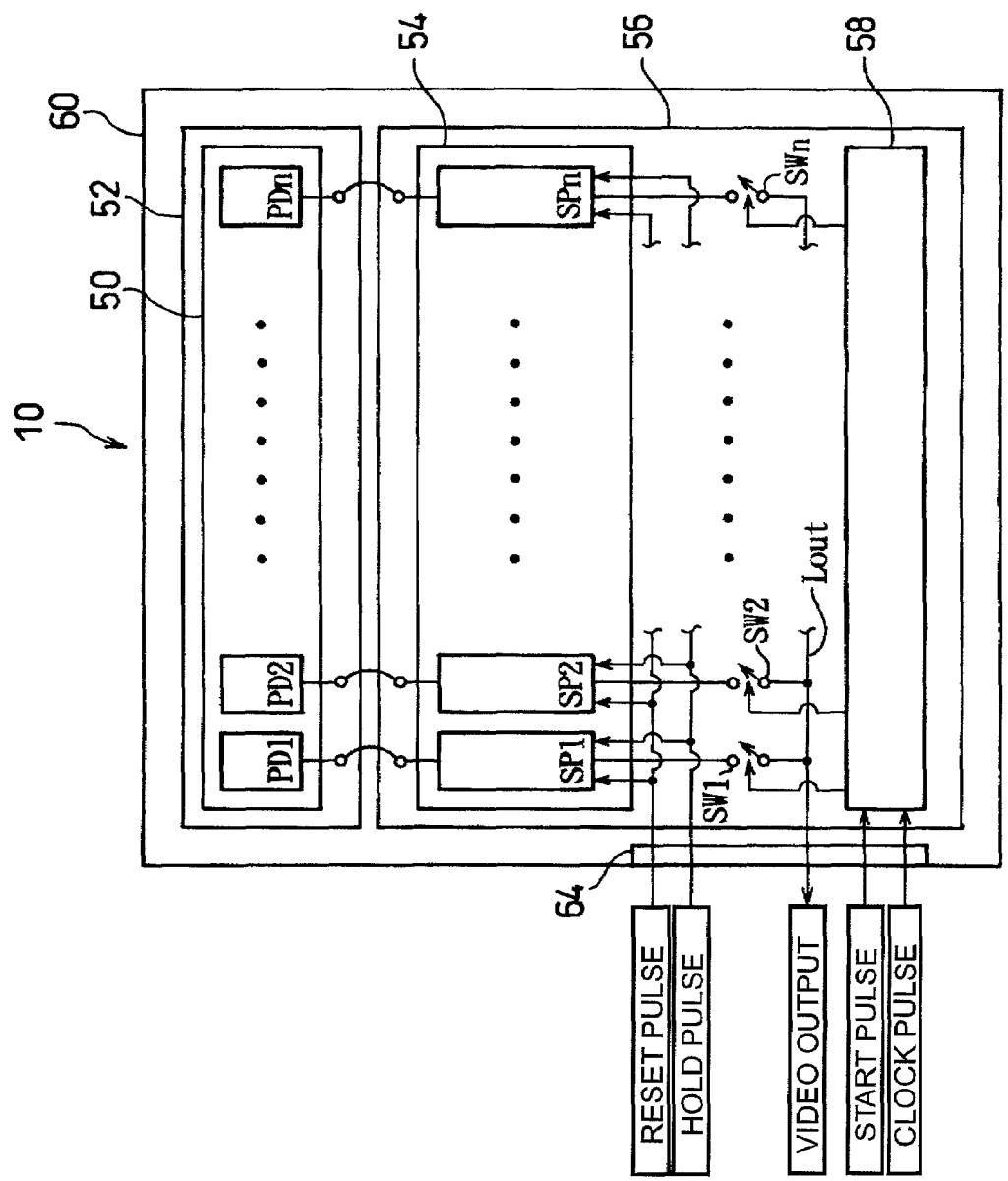
FIG. 2 is a block diagram showing the image sensing apparatus.
Figure 3:
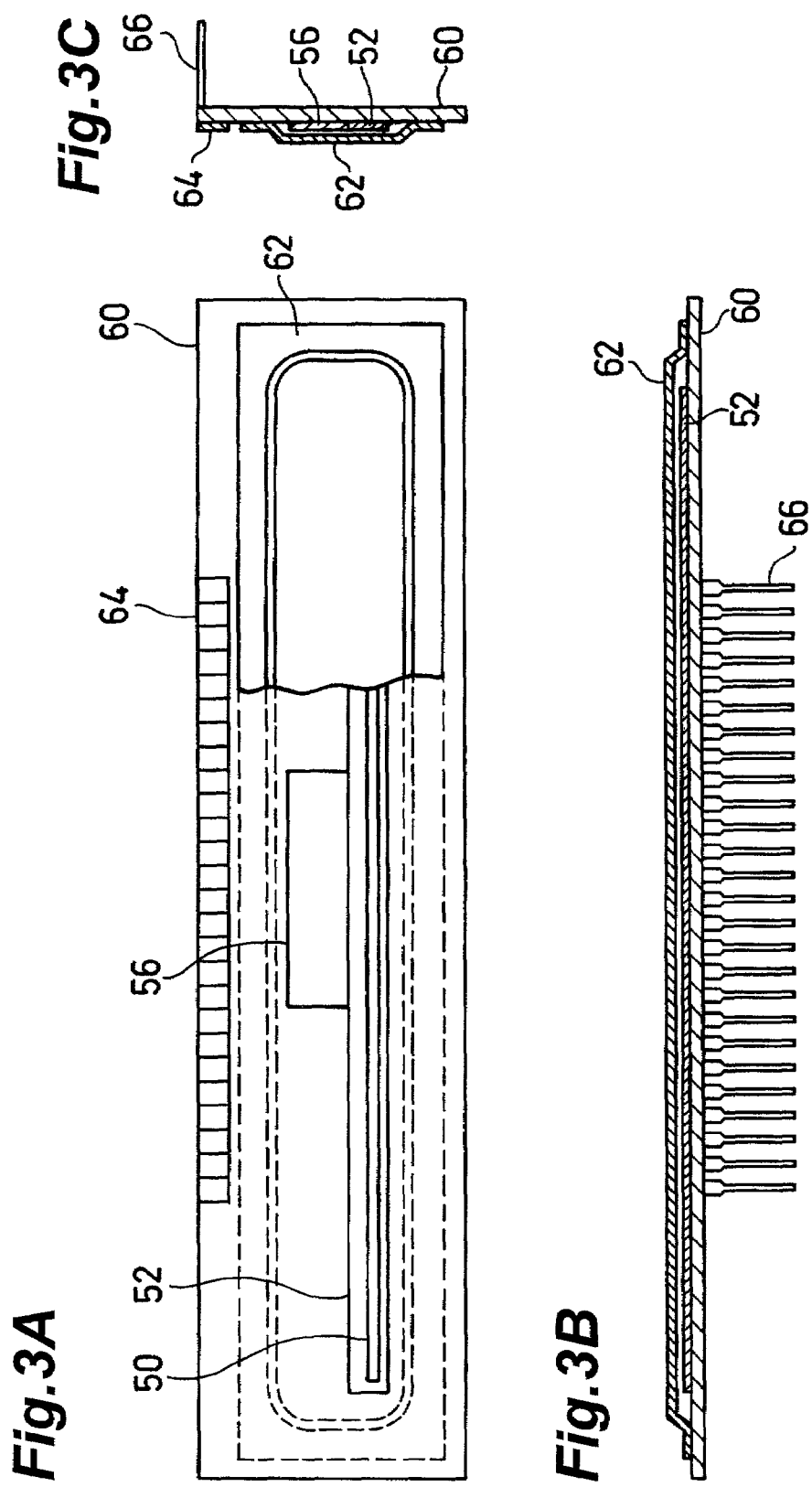
FIG. 3A is a plan view showing the image sensing apparatus.
FIG. 3B is a front view showing the image sensing apparatus.
FIG. 3C is a side view showing the image sensing apparatus.

FIG. 2 is a circuit diagram showing the image sensing apparatus according to the embodiment formed on a board. FIG. 3A is a plan view, FIG. 3B is a front view, and FIG. 3C is a side view all showing the image sensing apparatus according to the embodiment formed on the board.

As shown in FIG. 2, the n photodiodes PD1 to PDn are formed as a photodiode array 50 on a photodiode array chip 52. The n signal processors SP1 to SPn are formed as a signal processor array 54 on an amplifier array chip 56. The n output switches SW1 to SWn and a shift register 58 for controlling ON/OFF operation of the n output switches SW1 to SWn are also formed on the amplifier array chip 56. The photodiode array chip 52 and amplifier array chip 56 are fixed to a ceramic board 60, and covered with a protective cover 62 (see FIGS. 3A to 3C).

As shown in FIGS. 3A to 3C, connector pads 64 and connector pins 66 for externally inputting and outputting signals are attached to the end of the ceramic board 60, and are connected to the signal processors SP1 to SPn, output switches SW1 to SWn, shift register 58, and the like via metal wires (not shown) formed on the ceramic board 60 (see FIG. 2). The ON/OFF operations of the reset switches 30 and hold switches 36 formed in the signal processors SP1 to SPn are controlled by a reset pulse and hold pulse externally input via the connector pads 64 and connector pins 66. The ON/OFF operations of the output switches SW1 to SWn are controlled based on a start pulse and clock pulse externally input to the shift register 58, and video outputs are outputted via the external output line $L_{out}$ (see FIG. 2).

Figure 4:
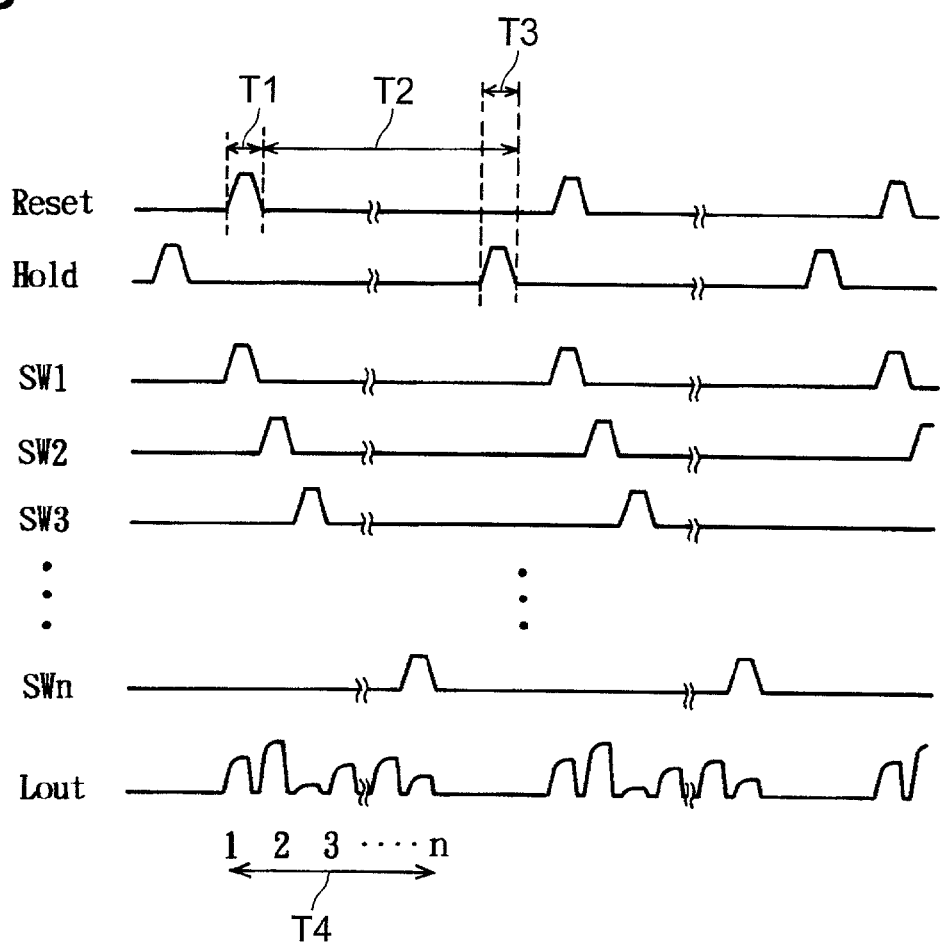
FIG. 4 is a timing chart showing the operation of the image sensing apparatus.

The operation of the image sensing apparatus according to the embodiment of the present invention will be explained. FIG. 4 is a timing chart showing the basic operation of the image sensing apparatus 10.

If an externally input reset pulse changes to logical value 1 (to be referred to "ON" hereinafter), the reset switch 30 of the integrator 12 is closed to remove (reset) charges integrated in the capacitor 28 (T1 in FIG. 4). After that, if the reset pulse changes to logical value 0 (to be referred to "OFF" hereinafter), the capacitor 28 starts integrating charges (T2 in FIG. 4).

If an externally input hold pulse changes to ON, the hold switch 36 of the buffer 14 is closed, and charges integrated in the capacitor 28 of the integrator 12 flow into the capacitor 32 of the buffer 14 where the charges are held (T3 in FIG. 4).

If the output switches SW1 to SWn are sequentially closed by the shift register 58 while charges are held by the capacitor 32 of the buffer 14, outputs are sequentially read out from the buffers 14 of the respective signal processors to the external output line $L_{out}$ (T4 in FIG. 4).

Since these reset pulse and hold pulse periodically change to ON, outputs from the photodiodes PD1 to PDn can be read out every predetermined time interval. That is, an object can be sensed.

The operation of the image sensing apparatus 10 will be described in more detail. The operation of the image sensing apparatus 10 greatly changes between a case in which the output voltage from the integrator 12 is lower than the reference voltage $V_{ref}$ and a case in which the output voltage from the integrator 12 is equal to or higher than the reference voltage $V_{ref}$.

Figure 5:
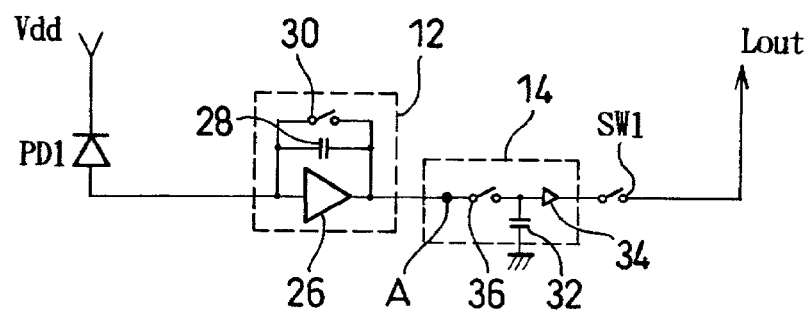
FIG. 5 is a circuit diagram showing the image sensing apparatus.
Figure 6:
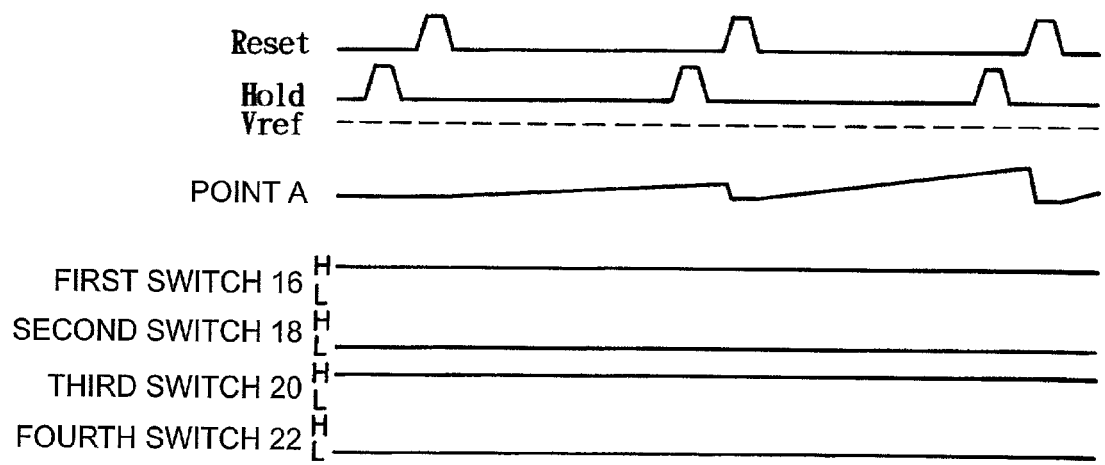
FIG. 6 is a timing chart showing the operation of the image sensing apparatus.

Assume that the output voltage from the integrator 12 is always lower than the reference voltage $V_{ref}$. FIG. 5 is an equivalent circuit diagram (except for the controller 24) showing the photodiode PD1, signal processor SP1, and output switch SW1 when the output voltage from the integrator 12 is always lower than the reference voltage $V_{ref}$. FIG. 6 is a timing chart showing the potential of the input terminal (point A; see FIG. 5) of the hold switch 36 and the ON/OFF states of the first to fourth switches 16, 18, 20 and 22 when the output voltage from the integrator 12 is always lower than the reference voltage $V_{ref}$. In FIG. 6, H and L represent ON and OFF states in the first to fourth switches, respectively.

When the output voltage from the integrator 12 is always lower than the reference voltage $V_{ref}$, the first, second, third, and fourth switches 16, 18, 20, and 22 are always ON, OFF, ON, and OFF, respectively. As shown in FIG. 5, charges output from the photodiode PD1 are always integrated in the capacitor 28 of the integrator 12 every time the reset pulse changes to ON, flow into the capacitor 32 of the buffer 14 where the charges are held when the hold pulse changes to ON, and read out to the external output line $L_{out}$ at the ON timing of the output switch SW1.

Figure 7:
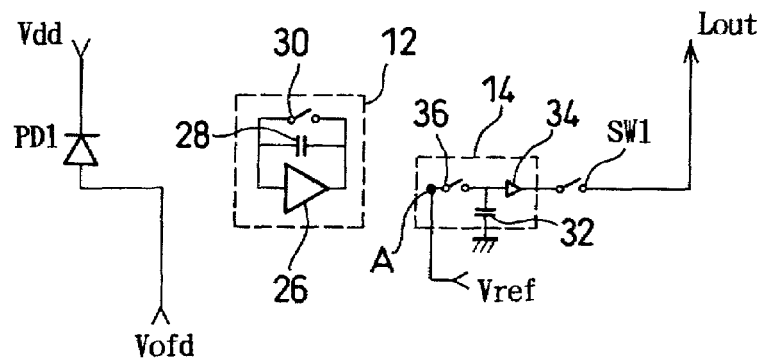
FIG. 7 is a circuit diagram showing the image sensing apparatus.
Figure 8:
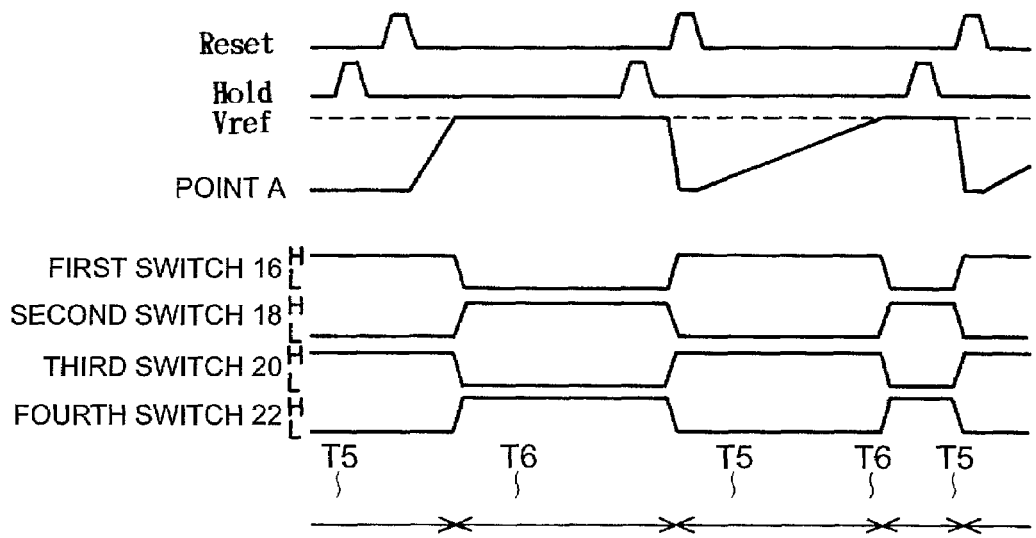
FIG. 8 is a timing chart showing the operation of the image sensing apparatus.

Assume that the output voltage from the integrator 12 is equal to or higher than the reference voltage $V_{ref}$. FIG. 7 is an equivalent circuit diagram (except for the controller 24) showing the photodiode PD1, signal processor SP1, and output switch SW1 when the output voltage from the integrator 12 is equal to or higher than the reference voltage $V_{ref}$. FIG. 8 is a timing chart showing the potential of the input terminal (point A; see FIG. 7) of the hold switch 36 and the ON/OFF states of the first to fourth switches 16, 18, 20 and 22 when the output voltage from the integrator 12 is equal to or higher than the reference voltage $V_{ref}$. In FIG. 8, T5 is a period during which the output voltage from the integrator 12 is lower than the reference voltage $V_{ref}$, and T6 is a period during which the output voltage from the integrator 12 is equal to or higher than the reference voltage $V_{ref}$.

As shown in FIG. 7, when the output voltage from the integrator 12 is equal to or higher than the reference voltage $V_{ref}$, the first, second, third, and fourth switches 16, 18, 20, and 22 are always OFF, ON, OFF, and ON, respectively. Since the first and second switches 16 and 18 are OFF and ON, excessive charges output from the photodiode PD1 can be removed by flowing them into the overflow drain $V_{ofd}$ without flowing them into the integrator 12, as shown in FIG. 7. Since the third and fourth switches 20 and 22 are OFF and ON, not a high voltage output from the integrator 12 but the reference voltage $V_{ref}$ can be output to the external output line $L_{out}$.

More specifically, as shown in FIG. 8, when the output voltage from the integrator 12 is lower than the reference voltage $V_{ref}$, i.e., during the period T5, the first, second, third, and fourth switches 16, 18, 20, and 22 are ON, OFF, ON, and OFF, respectively. The photodiode PD1, signal processor SP1, and output switch SW1 form an equivalent circuit (except for the controller 24) like the one shown in FIG. 5, and operate as shown in FIG. 6. To the contrary, when the output voltage from the integrator 12 is equal to or higher than the reference voltage $V_{ref}$, i.e., during the period T6, the first, second, third, and fourth switches 16, 18, 20, and 22 are OFF, ON, OFF, and ON, respectively. The photodiode PD1, signal processor SP1, and output switch SW1 form an equivalent circuit (except for the controller 24) like the one shown in FIG. 7. While the output voltage from the integrator 12 is equal to or higher than the reference voltage $V_{ref}$, the potential of the point A is kept at $V_{ref}$. If the output switch SW1 is closed in this state, the voltage $V_{ref}$ is read out to the external output line $L_{out}$. Note that if the reset pulse changes to ON in this state, the capacitor 28 of the integrator 12 is discharged to decrease the output voltage from the integrator 12. As a result, the first, second, third, and fourth switches 16, 18, 20, and 22 are closed, opened, closed and opened, i.e., return to the equivalent circuit shown in FIG. 5.

The effects of the image sensing apparatus according to the embodiment of the present invention will be described. In the image sensing apparatus 10, when the output voltage from the integrator 12 is equal to or higher than the reference voltage $V_{ref}$, the controller 24 opens the first switch 16, closes the second switch 18, opens the third switch 20, and closes the fourth switch 22. Since the first and second switches 16 and 18 are OFF and ON when the output voltage from the integrator 12 is equal to or higher than the reference voltage $V_{ref}$, excessive charges output from the photodiode PD1 can be removed by flowing them into the overflow drain $V_{ofd}$ without flowing them into the integrator 12. This can prevent variations in offset voltage of the operational amplifier 26 in the integrator 12, and can prevent variations in bias voltage caused by the variations in offset voltage. Accordingly, variations in outputs from other photodiodes caused by variations in bias voltage can be prevented to reduce malfunction and stabilize the operation.

Since the third and fourth switches 20 and 22 are OFF and ON when the output voltage from the integrator 12 is equal to or higher than the reference voltage $V_{ref}$, not a high voltage output from the integrator 12 but the reference voltage $V_{ref}$ can be output to the external output line $L_{out}$. This can prevent a very high output from being externally outputted, and can stabilize an external output.

Note that the operation of the image sensing apparatus 10 has been described in detail by exemplifying the case in which the p-type layer of the photodiode is connected to the integrator 12. Alternatively, the image sensing apparatus 10 can be realized using as a photodetector a photodiode whose surface is an n-type thin layer. In this case, the integrator 12 has an opposite output polarity, and the operation of the comparator 38 is also reverse to that described above.

What is claimed is:

1. An image sensing apparatus characterized by comprising:
    a plurality of photodetectors;
    resettable integrators which are arranged for said respective photodetectors, integrate charges output from said photodetectors, and output voltage signals corresponding to integrated charge amounts;
    output switches arranged on output sides of said respective integrators to connect said integrators to an external output line;
    a first switch series-inserted between each photodetector and each integrator; and
    a controller for closing said first switch when an absolute value of an output voltage from said integrator is lower than a predetermined reference voltage, and opening said first switch when the absolute value of the output voltage from said integrator is not lower than the predetermined reference voltage
    characterized in that said apparatus further comprises a second switch for connecting each photodetector and an overflow drain for removing charges output from said photodetector, and
    said controller opens said second switch when the absolute value of the output voltage from said integrator is lower than the predetermined reference voltage, and closes said second switch when the absolute value of the output voltage from said integrator is not lower than the predetermined reference voltage.

2. An image sensing apparatus characterized by comprising:
    a plurality of photodetectors:
    resettable integrators which are arranged for said respective photodetectors, integrate charges output from said photodetectors, and output voltage signals corresponding to integrated charge amounts;
    output switches arranged on output sides of said respective integrators to connect said integrators to an external output line;
    a first switch series-inserted between each photodetector and each integrator; and
    a controller for closing said first switch when an absolute value of an output voltage from said integrator is lower than a predetermined reference voltage, and opening said first switch when the absolute value of the output voltage from said integrator is not lower than the predetermined reference voltage
    characterized in that said apparatus further comprises:
    a third switch series-inserted between each integrator and each output switch; and
    a fourth switch for connecting a terminal of said output switch on the integrator side and a supply source for supplying the predetermined reference voltage, and
    said controller closes said third switch and opens said fourth switch when the absolute value of the output voltage from said integrator is lower than the predetermined reference voltage, and opens said third switch and closes said fourth switch when the absolute value of the output voltage from said integrator is not lower than the predetermined reference voltage.

* * * * *